United States Patent [19]

Hochbaum et al.

[11] 4,190,215
[45] Feb. 26, 1980

[54] TAPE RECORDER STOPPING MECHANISM

[75] Inventors: Istvan Hochbaum; Mandred Ketzer; Friedrich Laa; Johann Veigl, all of Vienna, Austria

[73] Assignee: U.S. Philips Corporation, New York, N.Y.

[21] Appl. No.: 941,546

[22] Filed: Sep. 12, 1978

[30] Foreign Application Priority Data

Sep. 14, 1977 [AT] Austria .............................. 6607/77

[51] Int. Cl.² .......................................... B65H 59/38
[52] U.S. Cl. ..................................... 242/186; 242/191
[58] Field of Search ............................... 242/186–191; 360/71, 74

[56] References Cited

U.S. PATENT DOCUMENTS

| 3,608,845 | 9/1971 | Kozu et al. ........................ 242/186 |
| 3,946,436 | 3/1976 | Takashino ........................ 360/74 |
| 3,973,743 | 8/1976 | Suzuki ........................ 242/186 |
| 4,089,487 | 5/1978 | Ichikawa et al. ........................ 242/186 |
| 4,123,015 | 10/1978 | Komatsu et al. ........................ 242/191 |

*Primary Examiner*—Leonard D. Christian
*Attorney, Agent, or Firm*—David R. Treacy

[57] ABSTRACT

A mechanism for performing a control function such as switching off an apparatus such as a tape recorder upon stopping of the rotary movement of a component at a time that other parts of the apparatus are still rotating. A pivotally mounted lever oscillates in response to rotation of the component, and stays at a central position upon stopping of the component. A coupling rod links the lever to a reciprocating connecting rod, and diverts the connecting rod from a path which will intercept the control function actuating device when the lever oscillates away from the central position.

7 Claims, 2 Drawing Figures

TAPE RECORDER STOPPING MECHANISM

BACKGROUND OF THE INVENTION

The invention relates to a recording and/or playback apparatus having a device for stopping or changing over the transport of a record carrier when an apparatus component, which rotates only during record-carrier transport, is stationary. Magnetic tape recorders are a common example of such apparatus and for simplicity the invention will be described in connection with such recorders, but without limiting application or scope of the claimed invention. This device comprises an eccentric drive member and an actuating member, which can both be driven uniformly and continuously by a motor of the apparatus, the drive member performing a rotary movement and being adapted to cooperate with a pivotably journalled lever. In its turn the lever is connected to the apparatus component through a friction coupling, which exerts a torque on the lever while the component is rotating normally so as to keep the lever positioned against the drive member, so that the lever oscillates pivotally when the apparatus component rotates and is set to a stationary position by the drive member when the apparatus component is stationary. The actuating member performs a periodic movement, from which a control function such as the stop or change-over operation for the record carrier drive can be derived by the actuation of a switching device through the actuating member when the lever is in the stationary position only.

Such apparatus is described in German Auslegeschrift 1,952,842, to which U.S. Pat. No. 3,608,845 corresponds. The operation of the device for stopping or changing over the record carrier drive in this apparatus is based on the fact that the relative movements of the drive member, of the actuating member and of the lever are coordinated in such a way that the actuating member can actuate the switching device only if the lever is in a stationary position when the apparatus component is stationary, and otherwise cannot perform its function. In this known apparatus the drive member and the actuating member are mounted on a flywheel which can be driven by the motor of the apparatus, so that during operation of the apparatus the lever, which is held against the drive member through the action of the friction coupling, is continuously in operative connection with the flywheel. The flywheel being connected directly to the drive spindle for the record carrier transport in the usual manner, this may give rise to an undesired influence on the record carrier transport, which manifest itself as a fluctuation, because as is known such a drive system is very sensitive, in particular if only smaller flywheels can be used for reasons of weight or space.

SUMMARY OF THE INVENTION

It is the object of the invention to eliminate speed fluctuation in the record carrier transport and to take steps which ensure that the record carrier drive is stopped or changed over in a particularly reliable manner. In accordance with the invention the drive member can be driven by a first wheel and the actuating member by a second wheel, both wheels can be driven continuously and uniformly by the motor, and the actuating member is constituted by a connecting rod, which is eccentrically and pivotably journalled on the second wheel and is articulated to the lever by a coupling rod, the coupling rod transmitting the swinging movement of the lever also to the actuating member and in the stationary position of the lever moving the actuating member to a position from which, during its reciprocating movement, it actuates the switching device. Thus a particularly simple, robust and reliable device for performing a control function such as stopping or changing over the record carrier drive is realized, which has virtually no undesired effects on the record carrier transport.

It is found to be particularly advantageous if the lever is provided with a cut-out which has two confronting walls which extend transversely to the direction of the swinging movement of the lever and are spaced from each other by a distance which is twice the maximum eccentricity of the drive member, and the drive member is arranged inside the cut-out. Thus, it is achieved that the device for stopping or changing over the record carrier drive responds in both directions of transport of the record carrier, i.e. both during forward transport and during reverse transport, because in one case the one wall and in the other case the other wall of the cut-out in the lever cooperates with the drive member depending on the direction of transport.

It will be noted that the apparatus described in the aforementioned U.S. Pat. No. 3,608,845 allows the record carrier drive to be stopped or changed over in only the forward direction of transport of said record carrier. In this respect it is further found to be advantageous if the drive member according to the invention is constituted by two similar cams which are 180° offset relative to each other and are spaced from each other in the direction of the axis of rotation of the drive member, which each time cooperate with one of the walls of the cut-out in the lever, which walls are also offset relative to each other in the direction of said axis of rotation. This ensures a particularly reliable operation, because the two cams at the same time unambiguously define the stationary position of the lever.

It has been found to be very effective if the first and the second wheel take the form of gear wheels, which belong to a common gear drive. This ensures an absolutely reliable uniform drive of the drive member and the actuating member, whithout slip between said members, which is important in view of a reliable operation of the device for stopping or changing over the record carrier drive, because the movements of the drive member and the actuating member should always be in a predetermined relationship to each other.

Furthermore, it has been found to be advantageous when for disabling the device for stopping or changing over the record carrier drive there is provided a shifting device for the lever, which acts on the lever by means of a spring, which spring tends to move the lever out of its stationary position upon actuation of the shifting device. Thus, the device for stopping or changing over the record carrier drive can be rendered inoperative in a simple manner, independently of the instantaneous position of the drive member, because the spring shifts the lever accordingly as soon as the position of the drive member allows this.

The invention will be described in more detail hereinafter with reference to the drawings, which show two embodiments, to which the invention is not limited. dr

DESCRIPTION OF THE PREFERRED EMBODIMENTS

Figure 1:
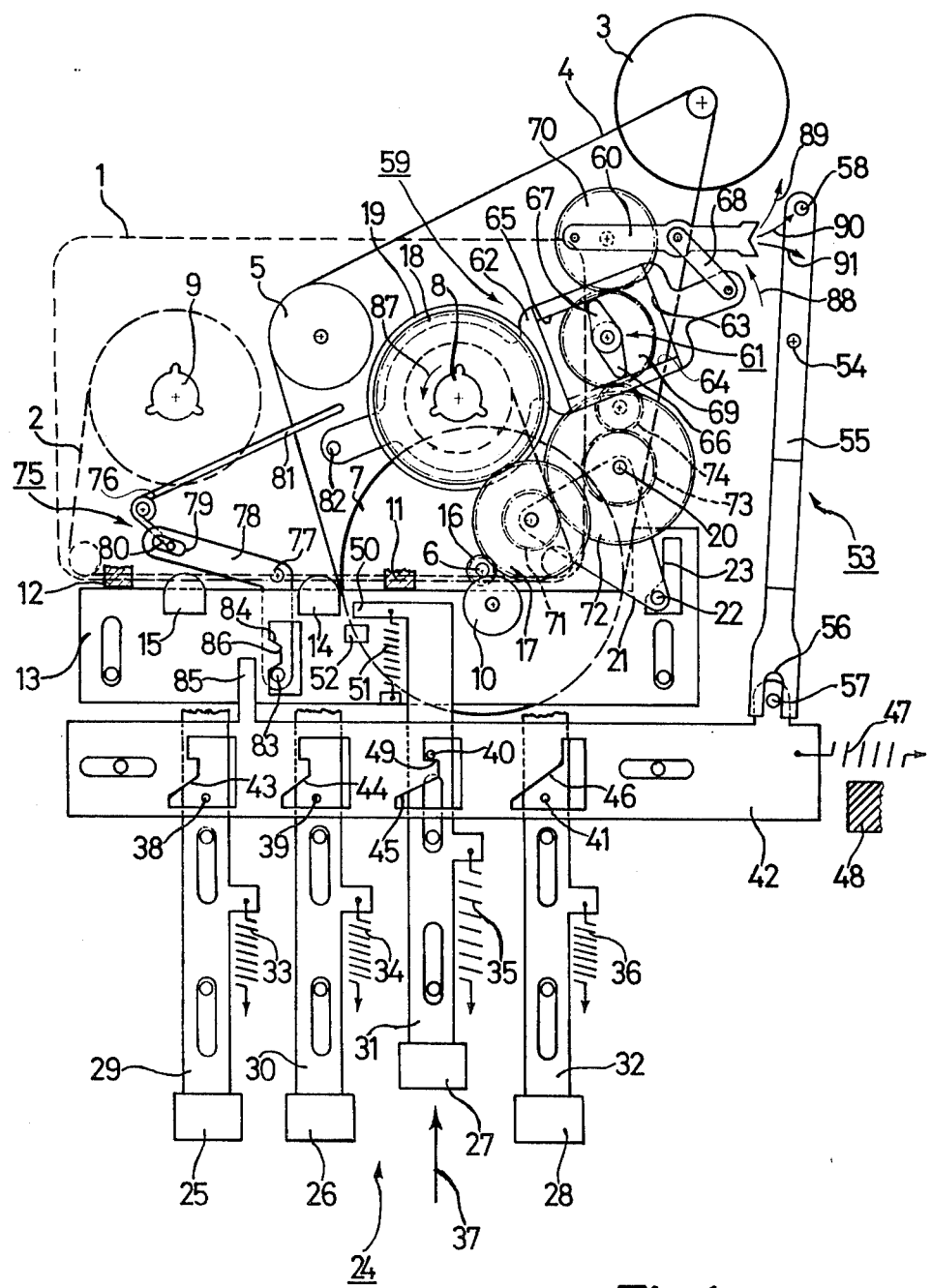
FIG. 1 is a plan view of the parts, which are relevant to the invention, of a tape recorder comprising a device for stopping the drive of record carrier tape, whose drive member is constituted by two cams.

FIG. 1 shows a recording and/or playback apparatus for a magnetizable record carrier 2 in the form of a tape which is accommodated in a cassette 1, which both are shown dotted for the sake of clarity. For driving the record carrier 2 the apparatus is equipped with a motor 3, which can be driven in one direction of rotation only and which via a belt 4 drives an idler wheel 5 and a flywheel 7 which is coaxially connected to a drive spindle or capstan 6. The idler wheel 5 can alternately be coupled, in a manner not shown, to one of two intermediate gears, by means of which two winding spindles 8 and 9 can be driven so as to wind the record carrier 2 with a high speed of transport between the two winding spindles in the "fast forward" and "fast rewind" modes. The drive spindle 6 serves for driving the record carrier with the normal speed of transport in the "normal forward transport" mode, as is shown in FIG. 1. A pressure roller 10 journalled on a support 13 cooperates with the drive spindle 6 in any known manner. The support 13 is movable towards and away from the cassette, and in the "normal forward transport" mode is held against two fixed stops 11 and 12 on the apparatus. Two magnetic heads 14 and 15 are mounted on the support for recording and/or playback or for erasing information on the record carrier.

In the "normal forward transport" mode the winding spindle 8 is driven by the flywheel 7 and the drive spindle 6. For this purpose the drive spindle 6 is coaxially connected to a pinion 16, engages with a gear wheel 17, which can drive a gear wheel 18 which is coaxial with the winding spindle 8. The gear wheel 18 drives a disc 19 is coaxial with the gear wheel 18 and which is non-positively connected to the winding spindle 8 by a friction lining, not shown, which cooperates with a side face of the gear wheel. The gear wheel 18, the disc 19 and the friction lining between these two elements then constitute a friction coupling. The gear wheel 17 is journalled on a triangular plate 21 which is pivotable about a spindle 20 which is fixed on the apparatus, which plate furthermore carries a control pin 22, which cooperates with a gate 23 formed in the support 13. Because of the gate 23 the position of the plate 21 and thus the position of the gear wheel 17 can be controlled to depend on the position of the support 13. In the "normal forward transport" mode, when the support 13 is positioned against the two stops 11 and 13 in its position in which it has been moved towards the cassette, the gear wheel 17 is in the position in which it engages with the gear wheel 18, as shown in FIG. 1. However, when the support 13 is in its position away from the cassette, the "normal forward transport" mode being switched off, the plate 21 is pivoted by the gate 23 and the control pin 22 so that the two gear wheels 17 and 18 are disengaged. However, the arrangement is such that the gear wheel 17 always remains in engagement with the pinion 16, as is necessary for driving the device for stopping the record carrier drive, to be described hereinafter.

For the selection of the modes of operation of the apparatus the apparatus comprises a switching unit 24, which in the present case comprises four push-buttons 25, 26, 27 and 28, which are respectively connected to axially movable switching rods 29, 30, 31 and 32, and which can each be depressed in the direction of the arrow 37 against the action of a spring 33, 34, 35 or 36 which acts on the relevant switching rod. For locking or releasing the push-buttons each switching rod respectively has a pin-shaped projection 38, 39, 40 or 41, which each extend into a gate-type cut-out 43, 44, 45 and 46 in a latching bracket 42. The latching bracket 42 is movable in its longitudinal direction and is loaded by a spring 47, which keeps the latching bracket against the fixed stop 48 on the apparatus in its rest position when none of the push-buttons is in its depressed on-position.

As previously stated, FIG. 1 represents the situation in which the "normal forward transport" mode is switched on, the push-button 27 being in its depressed on-position. The pin-shaped projection 40 on the switching rod 31 is then latched behind a detent 49 of the gate 45 in the latching bracket 42 and keeps the latching bracket in a latched position in which it is lifted off the stop 48 against the action of the spring 47. The free end of the switching rod 31 is provided with a projection 50, to which a spring 51 is secured, whose other end is attached to the support 13. Thus in the "normal forward transport" mode the support 13, as is shown in FIG. 1, is held in its operating position, in which it has moved towards the cassette, against the two stops 11 and 12 under the influence of the spring 51. When the support 13 occupies its rest position, which is remote from the cassette, the push-button 27 being in its off position, the projection 50 engages a stop 52 provided on the support 13, under the influence of the spring 51. Thus, the spring 35 on the switching rod 31 ensures that the support 13 is kept in its position remote from the cassette, the spring 51 keeping the stop 52 of the support 13 in engagement with the projection 50 of the switching rod 31.

The two push buttons 25 and 26 serve for switching on the "fast rewind" and "fast forward wind" modes, the corresponding switching operations in the apparatus being performed by the switching rods 29 and 30 respectively upon depression of one of the buttons, such as for example the previously mentioned coupling between the idler wheel 5 and the intermediate gears for driving the winding spindles 8 and 9. By means of the push-button 28 the apparatus can be set to the "stop" mode. Upon depression of this push-button 28 the pin-shaped projection 41 on its switching rod 32 engages the gate-type cut-out 46 and moves the locking bracket 42 so far against the action of the spring 47 that any other depressed push-button is released and is reset to its off-position under the influence of the spring which acts on the corresponding switching rod, the mode which has been selected by the released push-button being switched off. If all push-buttons occupy their off positions, the apparatus is in the "stop" mode, in which the drive for the record carrier is switched off. In the present example the motor 3 remains switched on in the "stop" mode. Stopping the motor is effected with a separated actuating element.

Further, the latching bracket 42 can be moved by means of a switching device 53 so as to release the depressed push-buttons, for switching off the record carrier drive. The switching device 53 comprises a switching lever 55 which is pivotable about a spindle 54. The lever has a slot 56 at one end, which engages a coupling pin 57 provided on the latching bracket 42, and an actuating pin 58 at its other end. When the actuating pin 58 is moved to the right, as is to be described hereinafter, the switching lever 55 of the switching device 53 is pivoted in a clockwise direction, the latching bracket 42 being moved so far against the action of the spring 47, that a depressed push-button is released.

As can also be seen from FIG. 1, the apparatus comprises a stop device 59 for actuating the switching device 53 to stop the record carrier transport, which device is operative upon on standstill of the winding spindle 8. The stop device 59 comprises an actuating member 60, which performs a periodic movement, and an eccentric drive member 61, which performs a rotary movement, which members can both be driven continuously and uniformly by the motor 3 of the apparatus, as is to be described hereinafter.

The drive member 61 is adapted to cooperate with a lever 62, which is pivotable about the axis of the winding spindle 8. The lever 62 is connected to an apparatus component which rotates only during record carrier transport and which in the present case is constituted by a disc 19 which is connected non-positively to the winding spindle 8 and consequently rotates only at the same time as the winding spindle, by engagement with an interposed further friction coupling provided with a friction lining, not shown in FIG. 1. As the winding spindle 8 rotates the friction coupling thus exerts a torque on the lever 62, and keeps the lever positioned against the drive member 61. Thus, it is ensured that when the winding spindle 8 rotates the lever 62 has a swinging or oscillating pivotal movement, which is determined by the varying eccentricity of the rotary drive member 61, and which when the winding hub is stationary central is set to a stationary position by the rotary drive member, which position is defined by the maximum eccentricity of said member and is represented in FIG. 1.

The lever 62 is provided with a cut-out 63, having two confronting walls 64 and 65, which extend transversely to the direction of the swinging movement of the lever and which are spaced from each other by a distance which is twice the maximum eccentricity of the drive member 61. The drive member 61, which is disposed inside said cut-out 63 and which can rotate within said cut-out, is preferably constituted by two similar cams 66 and 67, which are 180° offset from each other and are spaced from each other in the direction of the axis of rotation of the drive member, which cams are each arranged to engage one of the two walls 64 and 65 of the cut-out 63 in the lever 62, which walls are also offset from each other in the direction of the axis of rotation.

The actuating member 60 of the stop device 59 is constituted by a reciprocating connecting rod, which is linked to the lever 62 through a coupling rod 68 which is pivotally connected at its ends to the member 60 and lever 62 respectively. Thus, in addition to its own periodic reciprocating movement, the swinging movement of the lever 62 is transmitted to the actuating member 60 by the coupling rod 68; and in the stationary central position of the lever 62 the coupling rod 68 moves the actuating member 60 along a path to a position from which, as it reciprocates periodically, it actuates the switching device 53 for stopping the record carrier drive.

As can be seen from FIG. 1, the drive member 61, which is constituted by the two cams 66 and 67, can be driven by a first wheel 69; and the actuating member 60, which is constituted by the connecting rod, is driven by a second wheel 70 to which the actuating member is eccentrically pivoted, which two wheels can be driven continuously and uniformly by the motor 3. The two wheels 69 and 70 take the form of gear wheels, which belong to a common gear drive mechanism.

The continuously uniform drive of the two gear wheels 69 and 70 is provided by the motor 3 through the belt 4, the flywheel 7, the drive shaft 6, the pinion 16, which is coaxial with the drive shaft, and the gear wheel 17, which is continually in engagement with the pinion 16, which gear wheel 17 also serves for driving the winding spindle 8 in the "normal forward transport" mode, as described hereinbefore. A further gear wheel 71 is coaxially connected to the gear wheel 17, and engages the larger of a pair of gearwheels 72 and 73 which are connected together coaxially and are rotatable about the pivoting axis 20 of the plate 21. In turn, the smaller gear 73 engages an idler gear 74 which drives the first gear wheel 69, which in its turn is in engagement with the second gear wheel 70. In the present embodiment the transmission ratio between the first gear wheel 69 and the second gear wheel 70 is unity.

As is further shown in FIG. 1, the device for stopping the record carrier drive can also be rendered inoperative. For disabling the device a shifting device 75 acts on the lever 62 through a two-arm spring 76, the spring 76 tending to move the lever 62 out of its stationary position upon actuation of the shifting device 75.

The shifting device 75 comprises an angular lever 78, which is pivotable about a spindle 77, which lever has a slot 79 at one end which engages the bent end of an arm 80 of the spring 76. The other arm 81 of the spring 76 is adapted to cooperate with a pin 82 which is mounted on the lever 62. On the other end of the angular lever 78 a control pin 83 is mounted for actuating the shifting device 75. In this embodiment a gate 84 in the support 13 and a control tab 85 which projects from the latching bracket 42 are provided for cooperation with the control pin 83.

The gate 84 is shaped so that it causes no actuation of the shifting device 75 either in the operating position of the support 13, in which it has moved towards the cassette as shown in FIG. 1, or in the rest position of the support, in which it is remote from the cassette. Actuation by the gate 84 is effected only when the control pin 83 is positioned on the projecting portion 86 of the gate 84. This is the case when the support 13 is moved away only slightly from the cassette, in known manner, by actuation of a separate control button such as a "Pause" control, so that the pressure roller 10 is lifted off the drive spindle 6, and the gear wheel 17 is also disengaged from the gear wheel 18. In this situation the record carrier transport can be stopped temporarily, but then the stop device 59 should not be rendered operative.

When in such an operating situation the winding spindle 8 comes to a standstill, which would normally cause the record carrier transport drive to be stopped by the stop device 59, the lever 62 is urged in such a direction by the spring 76, as a result of the actuation of the shifting device 75 as the control pin 83 is positioned on the projecting portion 86 of the gate 84, that the lever is urged out of its stationary position as soon as the position of the rotary drive member 61 allows this. This further causes movement of the coupling rod 68 in such a way that the reciprocated actuating member 60 can not engage the actuating pin 58 of the switching device 53. This prevents the record carrier drive from being stopped by the stop device 59.

The control tab 85 on the latching bracket 42 moves the control pin 83 when the latching bracket 42 is in the rest position, which is defined by the stop 48. Thus, the shifting device 75 is actuated when none of the modes of operation has been switched on; that is when the apparatus is in the "stop" mode. As previously stated the record carrier drive is stopped but not the motor 3 in the "stop" mode of the present embodiment, so that the stop device 59 is still being driven continuously. This would give rise to the lever 62 being moved to its stationary position, so that the connecting rod 60 would cause a continuous actuation of the switching device 53 and thus a continual reciprocation of the latching bracket. However, as a result of the actuation of the shifting device 75 by the control tab 85, the lever 62 is periodically urged out of its stationary central position by the spring 76 when the drive member 61 rotates, so that the actuating member 60 is diverted from the path corresponding to the lever 62 central position, to avoid actuation of the switching device 53.

The operation of the device 59 for stopping the record carrier drive is described hereinafter, assuming that the apparatus is in the "normal forward transport" mode, as is shown in FIG. 1.

In the "normal forward transport" mode the winding spindle 8 is driven in the direction of the arrow 87. The winding spindle 8 is driven by the motor 3 through the belt 4, the flywheel 7, the pinion 16, the gear wheel 17 and the gear wheel 18, which last-mentioned gear wheel drives the disc 19 through the friction coupling, not shown, which disc is non-positively connected to the winding spindle 8. The disc 19 exerts a torque on the lever 62 through the further friction coupling, not shown, so that the lever 62 is urged in the direction of the arrow 88. The motor 3 furthermore drives the drive member 61 and the actuating member 60 of the stop device 59 continuously and uniformly. This drive is provided by the motor 3 via the belt 4, the flywheel 7, the pinion 16, the gear wheels 17, 71, 72, 73 and the gear wheel 74, which last-mentioned gear wheel drives the gear wheel 69 on which the drive member 61, constituted by two cams 66 and 67, is mounted. The gear wheel 69 engages the gear wheel 70, on which the actuating member 60, which takes the form of a connecting rod, is eccentrically journalled.

In this way the two cams 66 and 67 rotate within the cut-out 63 in the lever 62, and the wall 64 of the cut-out 63 is continually kept in engagement with the cam 66 as a result of the torque exerted on the lever 62. As a result of this, the lever 62 oscillates pivotally with a motion determined by the cam 66. The connecting rod 60 is reciprocated by the gear wheel 70. As the transmission ratio between the two gear wheels 69 and 70 is unity and because of the relative position of the cam 66 and the connecting rod 60, the connecting rod 60 assumes its position in which it is fully withdrawn from the switching device 53 while the wall 64 of the cut-out 63 is positioned against the portion of the cam 66 with maximum eccentricity, as is shown in FIG. 1, and the connecting rod 60 assumes its position which is nearest the switching device while the wall 64 is positioned against the portion of the cam 66 having minimum eccentricity. As the swinging movement of the lever 62 is superimposed on the reciprocating movement of the connecting rod 60 by the connecting rod 68, it is thus achieved that the fork-shaped free end of the connecting rod 60 cannot cooperate with the actuating pin 58 of the switching device 53, because the free end moves past the actuating pin 58 in the direction of the arrow 89.

When the winding spindle 8 now comes to a standstill, for example when the end of the record carrier which is attached to the winding hub in the cassette is reached, the disc 19 which is non-positively connected to the winding spindle 8 also comes to a standstill, so that the driving action exerted on the lever 62 by the further friction coupling is discontinued. The two gear wheels 69 and 70, however, are still uniformly driven by the motor 3, so that the cam 66 rotates further and the connecting rod 60 continues its reciprocating movement. By contact of the cam 66 portion having maximum eccentricity with the wall 64 of the cut-out 63 the cam 66 now moves the lever 62 to its central stationary position, in which position the lever 62 remains because of the absence of a driving torque. As a result, the lever 62 which is in a stationary position, and the coupling rod 68 move the connecting rod 60 to such a position, that the free end of the connecting rod is moved against the actuating pin 58 of the switching device 53 in the direction of the arrow 90. The connecting rod 60 then butts against the actuating pin 58 and pivots the switching lever 55 in the clockwise direction, so that the latching bracket 42, which is coupled to the switching lever 55 by the slot 56 and the coupling pin 57, is moved so far against the action of the spring 47 that the detent 49 releases the pin-shaped projection 40. The push button 27 can then return to its off position under the influence of the spring 35, so that the "normal forward transport" mode and thus the record carrier drive is switched off. In the present embodiment the motor 3 then remains switched on.

After actuation of the switching device 53 by the connecting rod 60, this rod moves again opposite the direction of the arrow 90, the actuating pin 58 on the switching lever 55 of the switching device 53 following the connecting rod 60 under the influence of the spring 47 which acts on the latching bracket 42 until the latching bracket is positioned against the stop 48. In this rest position of the latching bracket 42 the control tab 85, engages the switching pin 83 on the angular lever 78 of the shifting device 75, so that the spring 76 urges the lever 62 out of its stationary central position, which it occupied until then. As a result of the rotation of the drive member 61 the lever 62, which is now loaded by the spring 76, again oscillates pivotally and its movement is transmitted by the coupling rod 68 to the connecting rod 60 which performs a reciprocating movement. Thus via the coupling rod 68 the lever 62 again moves the connecting rod 60 to that position in which the connecting rod moves past the actuating pin 58 of the switching device 53 in the direction of the arrow 89, so that a further movement of the switching lever 55 and the latching bracket 42 is prevented while the motor 3 is running.

The operation of the stop device 59 in the "fast-forward" mode, in which the winding spindle 8 is driven in the same direction of rotation but with a higher speed, is fully identical to the operation in the "normal forward transport" mode, so that this is not described in more detail. In the "fast rewind" mode the operation of the stop device 59 differs only in that the winding spindle 8 rotates in a direction opposite to that of the arrow 87, as a result of which the lever 62 is moved in a direction opposite to the arrow 88 and cooperates with the other cam 67 via the wall 65 of the cut-out 63. When the record carrier is being driven the free end of the connection rod 60 is then consequently moved past the actuating pin 58 of the switching device 57 in the direction of the arrow 91. When the winding spindle 8 comes to a standstill when the end of the record carrier is reached, the drive torque exerted by the further friction coupling ceases, after which the cam 67 resets the lever 62 to its stationary position. In this position of the lever the connecting rod 60 again moves into the position in which the free end of the connecting rod is moved in the direction of the arrow 90 and thus causes the switching device 53 to be actuated, so that the record carrier drive is stopped.

As is evident from the foregoing, this construction provides a particularly reliable and robust device for stopping the record carrier drive, having virtually no adverse effect on the record carrier transport. Suitably, the device is operative for both directions of transport of the record carrier, the switching process being the same for both directions of transport and a particularly fast and reliable stopping being ensured. In addition, the stop device can be rendered inoperative in a simple manner.

Figure 2:
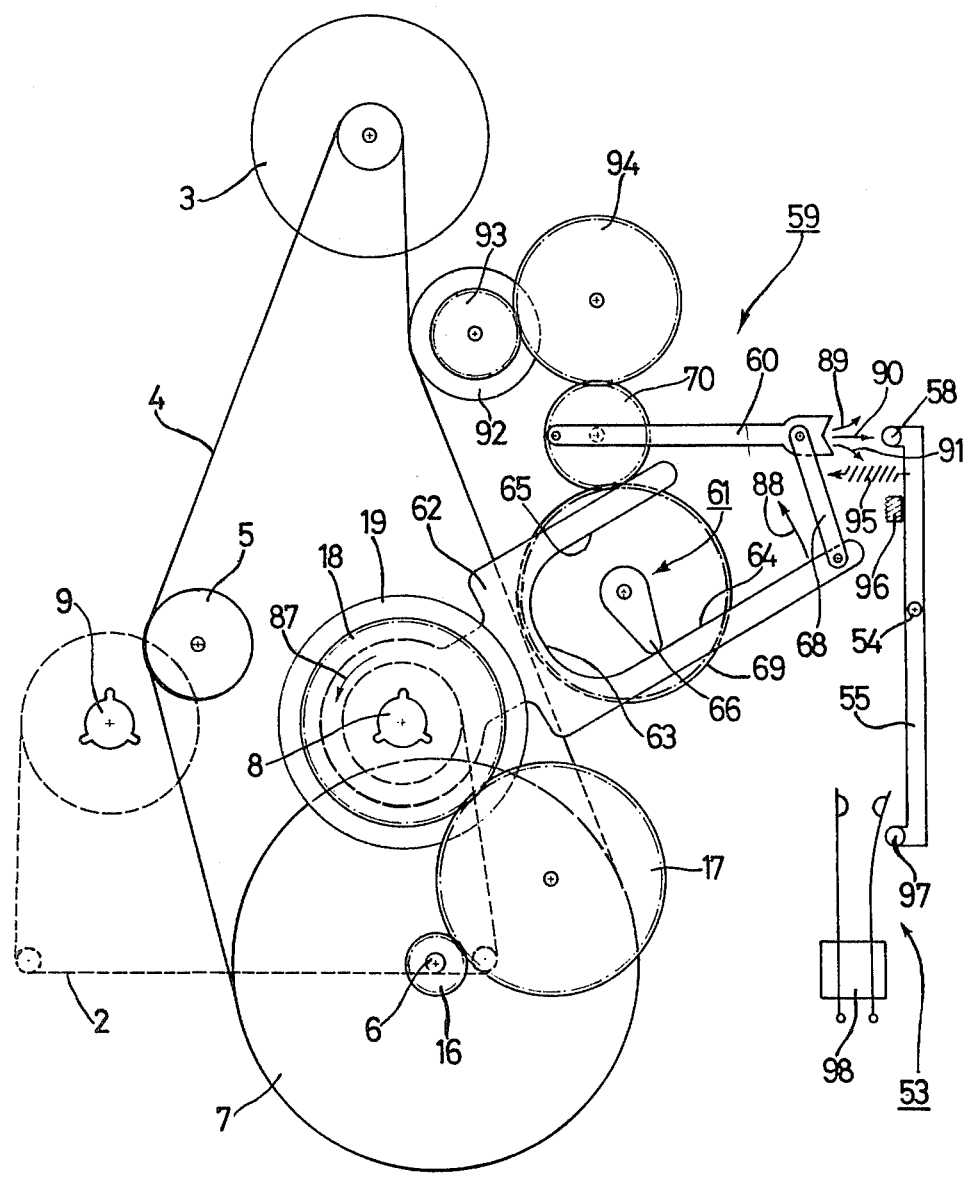
FIG. 2 is a plan view of a tape recorder according to a second embodiment of the invention having only one cam as drive member.

In the embodiment shown in FIG. 2, the actuating member 60 and the drive member 61 of the stop device 59 are driven by the motor 3, the belt 4 which is driven by the motor being passed over a pulley 92, which rotates a co-axial gear wheel 93, which in turn engages an idler gear wheel 94. The gear wheel 94 engages the gear wheel 70, on which the connecting rod 60, which constitutes the actuating member, is eccentrically journalled. The gear wheel 70 engages the gear wheel 69, on which the drive member 61 is mounted. The drive member, which cooperates with the lever 62, is constituted by a single cam 66 in the present embodiment, which cam depending on the direction of transport of the record carrier and the associated tilting movement of the lever 62 cooperates either with the wall 64 or with the wall 65 of the cut-out 63 in the lever 62, which in the present example is fork-shaped. The two walls 64 and 65 of the cut-out 63 and the cam 66 are then situated at the same level. The transmission ratio between the gear wheel 69 and the gear wheel 70 in the present embodiment is 2:1, so that the connecting rod 60 reciprocates twice for one revolution of the cam 66. The connecting rod 60 then always assumes its position which is remote from the switching device 53 when the lever 62 reaches its central position which is given by the maximum eccentricity of the cam 66. As the connecting rod 60 moves towards the switching device 53 the lever 62 is moved out of the central position because of the torque exerted on it by the further friction coupling. Thus, it is again ensured for both directions of transport of the record carrier that when the winding spindle 8 rotates the connecting rod 60 can not cooperate with the switching device 53, because the free end of the connecting rod 60 is moved past the actuating pin 58 of the switching device 53 when the record carrier is driven in the direction of the arrow 89 or 91 in accordance with the direction of transport of said record carrier is. Only during standstill of the record carrier the free end of the connecting rod 60 moved in the direction of the arrow 90, so that the switching device 53 is actuated.

It is obvious, that a series of modifications from the embodiments described hereinbefore are possible, in particular in respect of the cooperation of the drive member with the lever and the actuating member. Furthermore, a device in accordance with the invention may also serve for changing over the record carrier drive, i.e., to ensure that when the end of the record carrier is reached its direction of transport is automatically reversed. For example, as shown in FIG. 2 a spring 95 may bias the switching lever toward the actuating member 60, to butt against a stop 96. At the end of the lever 50 remote from the pin 58, a pin 97 on the lever is aligned with contacts is a switch 98. Upon engagement of the pin 58 by the actuating member and subsequent pivoting of the lever 55 clockwise, the switch 98 is closed and, for example, actuates an electromagnet to reverse transport. The electromagnet could alternatively return the recorder controls to the "stop" mode. Furthermore, the lever of such a device which is adjustable via a friction coupling cannot only be driven by a winding spindle or an apparatus component which is non-positively connected to said spindle, but this lever may for example also cooperate with a roller which is driven by the record carrier. It is obvious that such a device may also be designed so that it is operative for one direction of transport of the record carrier only, in which case the lever simply cooperates with only one wall with a cam.

What is claimed is:

1. A mechanism for performing a control function in an apparatus in response to stopping of a component in the apparatus, comprising
    an actuating device for performing a control function,
    a component mounted in the apparatus, and means for rotating the component,
    a pivotally mounted lever,
    means for pivotally oscillating said lever in response to rotation of said component, and for moving said lever to a given position in response to stopping of said component,
    a connecting rod,
    means for reciprocating the connecting rod, and
    a coupling rod linking said lever and said connecting rod, the rods being arranged so that while the lever is in the given position the connecting rod reciprocates along a path which engages the actuating device, and that during oscillation of the lever away from the given position the connecting rod is diverted to move past the actuating device.

2. A mechanism as claimed in claim 1 wherein the means for oscillating and moving includes a friction coupling connected between the lever and the component, arranged to bias the lever away from the given position while the component is rotating; and a cam surface on an element rotating in synchronism with the means for reciprocating and arranged so that, if the lever is away from the given position, the cam surface will engage the lever and move it to the given position at least once per revolution of the element.

3. A mechanism as claimed in claim 2, wherein the lever has a cut-out having two confronting walls extending transversely to the oscillating movement of the lever and spaced from each other by a distance equal to twice the maximum eccentricity of the cam surface, the element being arranged so that the cam surface moves inside the cut-out.

4. A mechanism as claimed in claim 3 wherein the cam surface is constituted by two similar cams offset from each other 180° and axially spaced from each other along the direction of the axis of rotation of the element, the walls of the cut-out being also offset from each other in said direction such that each cam is engageable with a respective one of said walls.

5. A mechanism as claimed in claim 2 comprising in addition means for disabling performance of the control function, said means for disabling comprising a spring and means for moving the spring to a position in which the spring resiliently urges the lever away from the given position.

6. A recording and/or playback apparatus for a record carrier tape, including a mechanism as claimed in claim 1 and a drive motor for transport of the tape, said component stopping in response to a stoppage of tape transport, wherein said means for reciprocating includes a wheel rotated by the drive motor, and an eccentric connection of one end of the connecting rod to the wheel for reciprocating the connecting rod, and said coupling rod is pivotally connected at a first end to said lever, and pivotally connected at a second end to said connecting rod at a point spaced from said eccentric connection.

7. An apparatus as claimed in claim 6, wherein the lever is pivoted coaxially with said component; said means for oscillating and moving including a friction coupling connected between the lever and the component, arranged to bias the lever in the direction of rotation of the component; and a cam surface on an element rotating in synchronism with the means for reciprocating and arranged so that, if the lever is away from the given position, the cam surface will engage the lever and move it to the given position at least once per revolution of the element.

* * * * *